Oct. 22, 1963 A. FEINER 3,108,157

MULTIPLE STATION COMMUNICATION CIRCUIT

Filed June 15, 1959 2 Sheets-Sheet 1

INVENTOR
A. FEINER
BY
R. C. Winter
ATTORNEY

Oct. 22, 1963 A. FEINER 3,108,157

MULTIPLE STATION COMMUNICATION CIRCUIT

Filed June 15, 1959 2 Sheets-Sheet 2

INVENTOR
A. FEINER
BY
R. C. Winter
ATTORNEY

United States Patent Office 3,108,157
Patented Oct. 22, 1963

3,108,157

MULTIPLE STATION COMMUNICATION CIRCUIT

Alexander Feiner, Whippany, N.J., assignor to Bell Telephone Laboratories, Incorporated, New York, N.Y., a corporation of New York Filed June 15, 1959, Ser. No. 820,552
5 Claims. (Cl. 179—1)

This invention relates to communication systems, and more particularly, in one aspect, to telephone circuits for establishing bilateral communication among plural telephone subscriber lines.

Conference connections among a plurality of subscriber lines heretofore have required delicate and complex arrangements for properly adjusting signal levels and for avoiding regenerative recirculation of signals among the several subscribers. Further, changes in the number of conferees have required duplication of this adjusting effort. In order to insure adequate signal amplitudes among conferees and to compensate for line losses between distant subscriber stations, it has also been necessary to employ multiple amplifiers for voice signals in the subscriber lines. Resistive networks must be employed to dissipate any excessive or misdirected power resulting from such amplification. These complications heretofore have made the conference telephone connection a complex circuit and an expensive one, both in terms of power and in terms of equipment involved.

Objects of this invention are to provide a simple conference connection for multiple telephone subscribers, to eliminate unnecessary attenuation of voice signals, to reduce the number of amplifiers required for conference connections between plural subscribers, to eliminate a need for the employment of special circuit components in effecting a conference connection, and to expedite the addition to or removal from a conference connection of particular subscribers without need for delicate circuit adjustments.

It is a further object of my invention to include a multiplicity of subscriber lines in a common connection, such as a conference connection, wherein the transmission conditions are substantially identical to those which pertain when only two subscriber lines are connected together. Accordingly, in accordance with my invention, loss of energy between the various circuits on the addition of another subscriber or group of subscribers to a connection is prevented. Thus, from the standpoint of the central office switching system the transmission characteristics and power requirements of conference connections in accordance with my invention are substantially identical to those of normal connections set up by the switching system.

In one illustrative embodiment of my invention, two coupling networks are provided, each for association with a pair of subscriber lines. These networks each comprise a first pair of signal circuits and a second pair of signal circuits. Subscriber lines are each connected to signal circuits of the first pair. The characteristic of the coupling network is such that the second pair of signal circuits are isolated electrically from each other but are electrically coupled to the signal circuits of the first pair. As used herein, this isolation implies that a signal applied to one circuit of the pair is decoupled from the other circuit of the pair and will not appear thereon.

Networks of this type are known as conjugate networks, wherein the conjugacy refers to the electrical isolation between opposite pairs of signal circuits. In accordance with my invention this isolation or conjugacy between the second pair of signal circuits is assured by having matching impedances connected to the first pair of signal circuits, such as the subscriber lines of substantially equal impedances or an impedance substituted therefor, but electrical coupling between the first pair of signal circuits is assured by maintaining a severe impedance mismatch between the second pair of signal circuits of the coupling network.

These second signal circuits of the two coupling networks are connected in serial relationship through appropriate transmission paths. Thus, there is established a two-branch transmission loop interrupted in each of the coupling networks by the electrical isolation of the second signal circuits. In accordance with an aspect of my invention, each transmission path of this loop is arranged so that its input and output impedances are mismatched. In specific illustrative embodiments, in each branch of the transmission loop there is connected a grounded-base transistor amplifier, the two amplifiers in the two paths of the loop being mutually poled for serial signal transmission. Thus, amplification is provided for signals transmitted in either direction between the two coupling networks. At the same time, the relatively small input impedance and the relatively large output impedance of the transistor amplifiers effect the severe impedance mismatch between the second signal circuits in each of the coupling networks, thereby assuring that isolation or conjugacy does not exist between the first signal circuits of each coupling network.

In another illustrative embodiment of my invention more than two such hybrid coupling networks are employed, each having a small input impedance, high output impedance amplifier connected to receive signals from one of the conjugate signal circuits and to apply these signals in series to the other conjugate signal circuits of each of the other coupling networks. Thus, the very large output impedance of the amplifier is mismatched in each of the networks to which it is coupled to the very small input impedance of an associated amplifier connected to receive signals from that network. This impedance mismatch at the terminals of the conjugate signal circuits assures that the subscriber lines connected directly with the other signal circuits of each network are electrically intercoupled.

It is a feature of this invention that hybrid coupling networks are employed to interconnect communication lines in a conference or multiparty circuit, the communication lines being directly connected to one pair of opposite circuits of the coupling networks and the coupling networks being interconnected by connection to the other pair of circuits of each coupling network.

It is another feature of this invention that the signal circuits to which the other coupling networks are connected are conjugate or electrically isolated from each other while electrically coupled to each of the signal circuits to which the subscriber lines are connected.

It is a further feature of this invention that mismatching impedance elements be connected to the signal circuits to which the other networks are connected, the impedance mismatch assuring that conjugacy or isolation does not exist between the subscriber lines coupled to that network so that signals may be transmitted electrically directly between the two subscriber lines connected to each hybrid coupling network.

It is still another feature of specific embodiments of this invention that the various coupling networks be interconnected by amplifiers having a low input and high output impedance, the amplifiers being poled for transmission in the same direction in a path from one conjugate signal circuit of a particular coupling network to the opposite conjugate signal circuit of that coupling network. More specifically, it is a feature of certain specific illustrative embodiments of my invention that a semiconductor and specifically a grounded base transistor amplifier be employed in the circuit between a pair of coupling networks for accomplishing amplification of two-way signals between the two networks, and, at the same time, assuring the desired severe impedance mismatch to attain coupling between the terminals to which the subscriber lines are coupled.

A complete understanding of this invention and of these and various other features thereof may be gained from consideration of the following detailed description and the accompanying drawing, in which.

Figures 1, 2A, 2B:
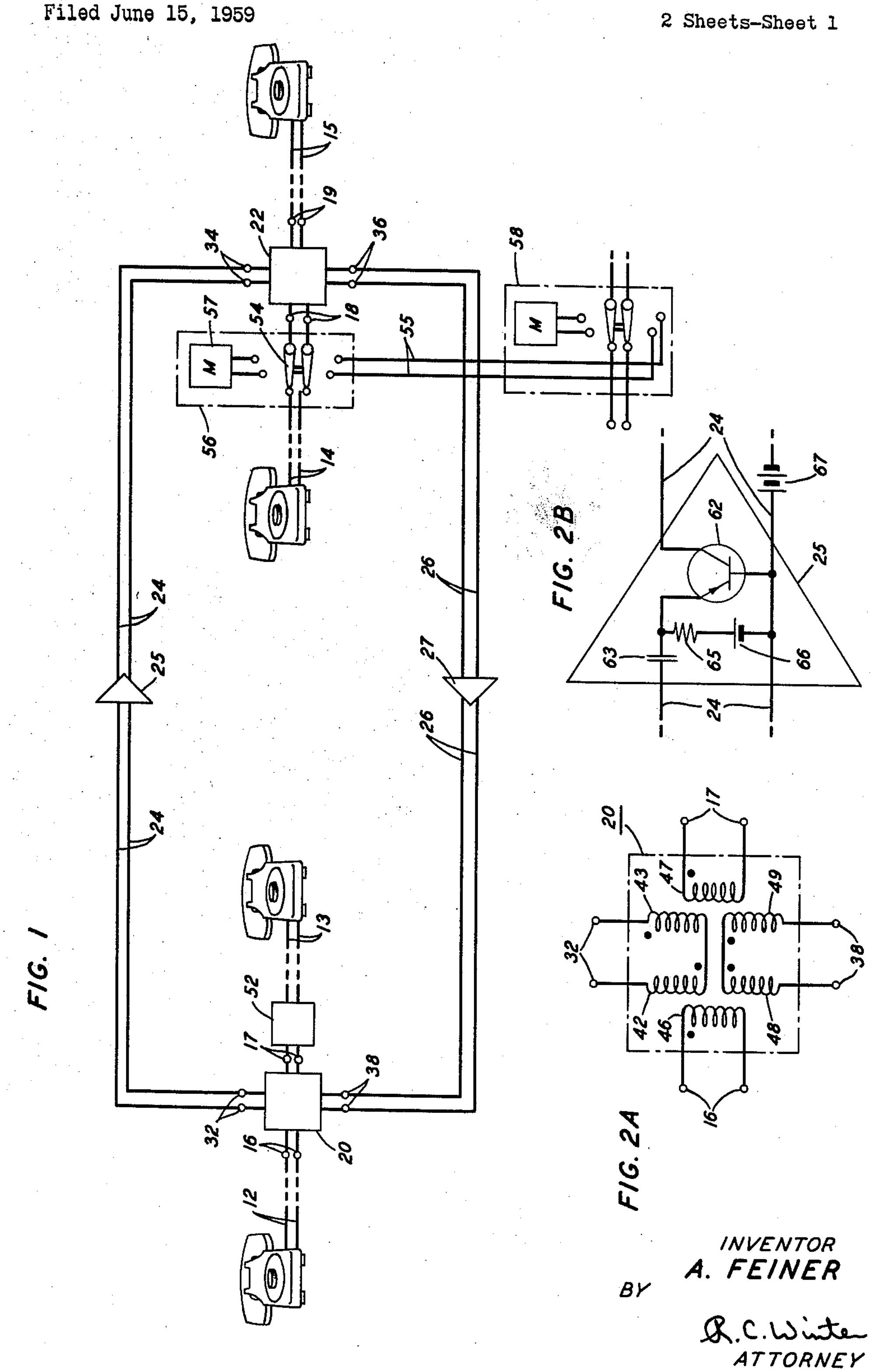
FIG. 1 is a schematic representation of one specific illustrative embodiment of my invention.
FIGS. 2A and 2B illustrate details of component circuit elements which may advantageously be employed in the circuit of FIG. 1.

Referring now to the drawing, FIG. 1 depicts one specific illustrative embodiment of my invention wherein four subscriber lines 12, 13, 14, and 15 may be interconnected for a conference connection or conversation. The subscriber lines may include typical telephone subscriber subset apparatus. Similarly, it is to be understood that these subscriber lines are not permanently associated with the conference connection network herein described but that suitable central office switching systems are employed to connect the subscriber lines, through suitable intermediate switching stages, to the conference circuitry of my invention; such central office switching systems may be of any type known in the art, and the control therefor may similarly be of any of the different types, either automatic or manual, known in the art.

In accordance with an aspect of my invention, the four subscriber lines between which a conference connection is to be established are connected to opposite terminals of two coupling networks 20 and 22. Specifically, subscriber lines 12 and 13 are connected to opposite terminals 16 and 17 of coupling network 20 and lines 14 and 15 are connected to a pair of opposite terminals 18 and 19 of coupling network 22. Coupling networks 20 and 22 each contain two sets of opposite terminals and operate, in accordance with my invention, so that coupling exists between the opposite terminals, such as 16 and 17, to which the subscriber lines are connected by the switching system, between each of the terminals and the adjacent terminals, but not between the other pair of opposite terminals.

A typical coupling network which may be employed with advantage in the circuit of FIG. 1 is the network 20 depicted in FIG. 2A. As shown diagrammatically in FIG. 2A, winding 46 is connected across terminals 16, winding 47 across terminals 17, windings 42 and 43 in series aiding across terminals 32, and windings 48 and 49 in series opposition across terminals 38. The polarities of the various windings of the network are indictated by the convention of black dots, one located at one end of each winding. The placement of these dots is to be understood as indicating that when a signal voltage is applied to an input winding with a sign such that the dotted end of the input winding is positive, the resulting induced voltage is likewise positive at that end of each output winding which is provided with the black dot.

The windings 46 and 47 constitute a first pair of signal circuits connected to the first pair of opposite terminals. The serially connected windings 42, 43 and 48, 49 constitute a second pair of signal circuits connected to the second pair of opposite terminals.

In accordance with an aspect of my invention, the impedances connected to the first pair of terminals are substantially matched, consisting, as they do, of substantially identical paths through the central office switching network and the subscriber lines; however, the impedances connected to the second pair of terminals are very severely mismatched. Under these conditions the terminals 32 and 38 are effectively isolated from each other, as in prior conjugate networks of this general type; however, the terminals 16 and 17 are not isolated from each other, but instead are electrically coupled together through the coupling network.

At the same time, the several windings of the coupling network 20 are poled and arranged within the network, as shown in FIG. 2A, to provide mutual intercoupling between the first and second pairs of signal circuits. For example, winding 46, in FIG. 2A, is electrically coupled to both windings 42 and 48, and terminals 16 are thus coupled to terminals 32 and 38.

Turning back to FIG. 1, the two coupling networks 20 and 22 are connected by unidirectional transmission paths 24 and 26, thereby providing a circulating transmission loop having two branches which include coupling networks 20 and 22 and transmission paths 24 and 26. These latter paths, in turn, include amplifiers 25 and 27, respectively, which are unidirectional amplifiers poled with respect to one another for conduction of signals in a serial circuit. These signal paths are connected to the coupling networks 20 and 22 by way of terminals 32, 34, 36, and 38, as can be seen in FIG. 1. Thus, these paths and associated circuitry form branches of a complete transmission loop.

In accordance with an aspect of my invention, coupling between the first pair of opposite terminals 16, 17 of the coupling network 20 and between the first pair of opposite terminals 18, 19 of coupling network 22 is attained by the amplifiers 25 and 27 included in the two branches of the circulating transmission loop and which each have input and output impedances mismatched in a like sense. Thus, the input impedance to the amplifier 25 is very small and the output impedance very large. Accordingly, the transmission path 24 presents a very low impedance to the signal circuit associated with the terminals 32. Similarly, the path 24 presents a very large impedance to the signal circuit associated with the terminals 34. A converse condition exists with regard to the terminals 36 and 38 associated with the path 26 and the amplifier 27. Thus, the signal circuits associated with the terminals 32, 38 and 34, 36 are connected with severely mismatched impedances.

The amplifiers by which this impedance mismatch is established advantageously are each a simple grounded base single stage transistor which is diagrammed schematically in FIG. 2B. As shown in this FIG. 2B, a single p-n-p transistor 62 is connected in grounded base configuration for receiving signals transmitted by way of the path 24 through a coupling capacitor 63. A biasing potential source 66 supplies forward biasing potential to the emitter electrode of the transistor 62 through a biasing resistor 65 and a similar biasing potential source 67 supplies a reverse bias potential to the collector electrode through any load impedance associated with the transmission path 24, which load impedance comprises the windings of the signal circuits of the other coupling network. Signals are passed in amplified form through the collector electrode of the transistor for further passage along the path 24.

As is well known in the art, signals applied to the emitter of such a grounded base connected transistor encounter negligible input impedance. At the same time these signals are passed through the collector electrode with a very large output impedance. This transistor amplifier provides substantial power amplification for signals passing from the coupling network 20 to the coupling network 22. Similarly, amplifier 27 provides amplification for signals passing from the network 22 to the network 20.

Regenerative recirculation of these signals is blocked by the isolated windings of the signal circuits associated with the terminals 32, 38 and 34, 36 in the two coupling networks, respectively. At the same time, subscriber lines 12, 13 and 14, 15 associated respectively with the two coupling networks, may be extended over long distances. This is possible because the amplifiers 25 and 27 compensate for loss of signal strength between the two coupling networks and also compensate for signal dissipation among the several subscriber lines.

The transistor 62 provides substantially unity current gain and the entire signal current from the path beween subscriber lines 12 and 13 is injected into transmission path 24. Accordingly, there is substantially zero transmission loss between any of lines 12 and 13 to any of lines 14 and 15.

The operation of this specific embodiment of my invention in establishing conference connections will now be described ignoring, for the moment, the presence of the boxes numbered 52, 56, and 58 in FIG. 1. When a subscriber, such as subscriber 12, desires a conference connection, he so informs the central office, which may most readily be considered to be done by calling the operator and giving her the information that a conference connection is desired with subscribers 13, 14, and 15. The switching system of the central office, either automatically or manually under the operator's control, then connects subscribers 12, 13, 14, and 15 respectively to terminals 16, 17, 18, and 19 of the coupling networks. When these connections have been made, the subscribers may then converse. The talking paths during this conversation are as follows: subscriber 12 talks to subscriber 13 through the coupling network 20, electrical coupling between these opposite terminals being obtained due to the severe impedance mismatch at the other opposite terminals of the network; subscriber 14 similarly converses directly with subscriber 15; subscribers 12 and 13, however, talk to subscribers 14 and 15 through the path 24 and amplifier 25 to the terminals 34 of the coupling network 22; and similarly subscribers 14 and 15 talk to subscribers 12 and 13 through transmission path 26 and amplifier 27.

If only three subscribers were to be connected in a conference connection or if more than four were to be so connected, the equipment indicated in boxes 56 or 58 would be utilized. Box 56 may advantageously include switches 54 which, while shown as mechanical switching elements, may advantageously comprise electronic or mechanical switching elements known in the art and compatible with the switching elements of the particular switching system with which my invention is utilized. Switches 54 connect the terminals 18 of the coupling network 22 to a subscriber line, such as 14, when a four party conference is desired; to a matching impedance 57 having an impedance matching that of the line 14, when only a three party conference connection is desired; or to a transmission path 55 which connects to a like switch 58 which in turn is connected to another coupling network, not shown, for connecting into the conference connection additional subscribers similarly connected to coupling networks and paired amplifiers, in accordance with the embodiment of my invention depicted in FIG. 1.

The impedance 57 acts to preserve the isolation between terminals 34 and 36 when only three parties are desired in the conference connection. Similarly matching impedances and switching elements may be provided at each of the terminals 16, 17, 18, and 19 of the coupling networks to provide that, when a single line connected in the conference connection hangs up, a matching impedance is automatically inserted in the line to prevent improper unbalancing of the impedances of the coupling networks. In this manner subscribers may be added to, or may withdraw from, a conference connection without destroying the connection between the other subscribers.

Circuit box 52 connected to terminals 17 of coupling network 20 may be similar to the circuitry of box 56.

Figure 3:
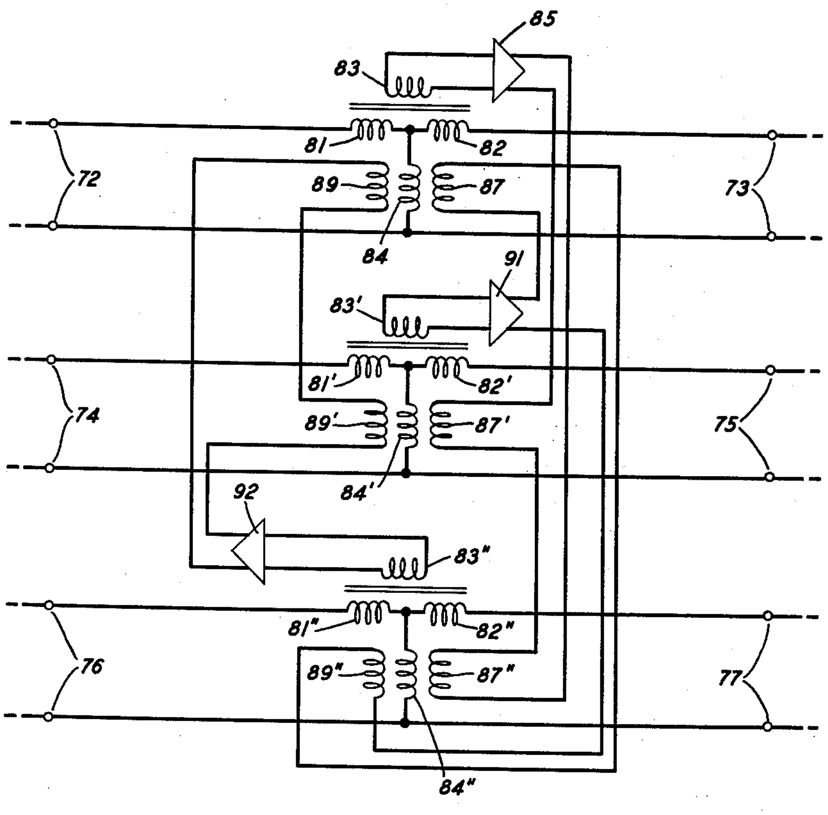
FIG. 3 is a schematic representation of a different embodiment of my invention wherein multiple subscriber lines may be accommodated with advantageous economy of signal amplifiers.

In FIG. 3 there is shown another circuit arrangement in accordance with a different illustrative embodiment of my invention. In this arrangement six like subscriber lines may be interconnected in a conference connection, the individual subscriber lines being connected, through the switching network, to the terminals 72, 73, 74, 75, 76, and 77 of three coupling networks. Each coupling network is identical so that only one need be described in detail.

Accordingly, considering the uppermost network, terminals 72 and 73 are directly connected by an upper path including balanced windings 81 and 82 and a lower path which is a straight conductive connection. A winding 83 is inductively coupled to both windings 81 and 82. A winding 84 is electrically connected between the upper and lower conductors of the transmission path between the terminals 72 and 73; specifically, winding 84 is connected to the upper conductor intermediate the windings 81 and 82. In such a coupling network conjugacy or electrical isolation exists between the windings 83 and 84. In accordance with my invention such conjugacy or isolation does not exist between the terminals 72 and 73 because of the severe impedance mismatch at the windings 83 and 84. To complete the coupling network, windings 87 and 89 are inductively coupled to the winding 84.

Signals applied at terminals 72 and 73 are inductively coupled through the serially connected, balanced windings 81 and 82 to winding 83 and thence, in parallel, to a low impedance input amplifier 85, which may be of the configuration depicted in FIG. 2B. Winding 84, which is balanced with respect to windings 81 and 82, is common to both the signal circuits associated with terminals 72 and 73. Input signals from other external sources, namely the other hybrid coupling networks, are inductively coupled to this common winding 84 from the associated windings 87 and 89 and are passed to terminals 72 and 73 alike for passage along the indicated subscriber lines. Windings 87 ad 89 thus provide two terminal pairs for the common winding or signal circuit 84.

In the identical hybrid coupling networks, associated with the terminals 74, 75 and 76, 77, signals from the very high output impedance amplifier 85 are applied in serial relation to the input windings 87′ and 87″. Thereafter such signals are coupled through windings 84′ and 84″, respectively, to the subscriber lines associated with the terminals 74, 75 and 76, 77. As shown, however, these signals are isolated from the amplifiers 91 and 92, connected respectively to the windings 83′ and 83″, by the relation of the windings 83′ and 83″ with windings 84′ and 84″, respectively. Thus, regenerative recirculation of signals through this circuit are avoided.

The amplifiers 91 and 92, which may also be of the type shown in FIG. 2B, each receive signals in parallel from the associated subscriber lines and apply these signals in serial relation to a plurality of other associated lines.

Accordingly, very low impedance is presented to the windings correponding to windings 81 and 82 in each hybrid coupling network while a very large impedance is presented to the winding corresponding to winding 84. This impedance unbalance, in accordance with my invention, assures that the terminals 72 and 73, and similarly the other pairs of terminals, will be electrically coupled together. At the same time the impedance match at these termials 72 and 73, et cetera, assures that the windings 83 and 84 remain electrically isolated from each other. Further, the three amplifiers 85, 91, and 92 serve to amplify signals passing in each direction between the six subscriber lines.

Of course, the arrangement depicted in FIG. 3 is not confined to six subscriber lines but may serve $n$ lines so long as $n/2$ amplifiers and related coupling networks are provided. Further, the arrangements depicted in conjunction with FIG. 1 for providing matching impedances in lieu of any particular subscriber line may also be utilized.

It should be pointed out that the current sensing series windings 81 and 82 interfere with the connection between terminals 72 and 73 only to the extent of the flat loss of the windings themselves since the secondary winding 83 is effectively shorted by the emitter of the transistor amplifier 85. With amplifiers having very high impedance mismatch between input and output impedances, such as approaching infinity, as can be reasonably attained by the single grounded base transistor of FIG. 2B, the power inserted into the path joining the other pair of subscriber terminals is such that no net loss exits between the initial subscriber termials 72 and 73 and the subscriber terminals in the other path and vice versa. The current gain in each amplifier alone may advantageously be unity, but the current gain in the transmission paths including the amplifiers may be higher by suitably choosing the turns ratio in the coupling coils.

While specific illustrative embodiments of my invention have been described herein, it is, of course, to be understood that these arrangements are merely illustrative of the application of the principles of my invention. Thus, numerous other arrangements may be devised by those skilled in the art without departing from the spirit and scope of my invention. For example, it is clear that the transistor amplifier described may be replaced by other amplifiers having similarly mismatched input and output impedances. Illustrative of these amplifiers are feedback amplifier types having a very large input impedance and a very small output impedance. However, if such amplifier types are employed, the input and output terminals of the transmission path from the coupling network should be reversed. Thus, in the network of FIG. 3, the input to the transmission path would be taken from winding 84 in shunt with the path between terminals 72 and 73 and the output from the transmission path would be applied to the network at the windings 81 and 82 in series with the path between the terminals 72 and 73. Thus, it is to be understood that, in accordance with my invention using a network asd epicted in FIG. 3, the signal transmission between the terminals of a coupling network directly connected to subscriber lines is never impaired by the coupling network connections, the impedance mismatch always providing a low series and a high shunt impedance to the path between the subscriber lines of a coupling network.

Further, in other specific embodiments of my invention, the transmission paths between pairs of coupling networks may be constructed in accordance with known techniques without benefit of amplifiers to have the desired mismatched input and output characteristics.

What is claimed is:

1. In a communication circuit for establishing multiple connections between subscriber lines wherein a first coupling network has first and second opposed terminal pairs and a second coupling network has third and fourth opposed terminal pairs, first means interconnect said first and second opposed terminal pairs and second means interconnect said third and fourth opposed terminal pairs, said first and second interconnecting means each comprising first, second and third two-terminal windings, said first and second windings being series connected between two upper terminals of said opposed terminal pairs of one of said networks, and said third winding being connected between the junction of said series connected first and second windings and the remaining lower two terminals of said opposed terminal pairs of said one network, and means are provided for connecting subscriber lines to said terminal pairs, the improvement comprising amplifier means coupled through said networks in two distinct transmission paths between said first and second opposed terminal pairs and said third and fourth opposed terminal pairs, said amplifier means each having a low input and a high output impedance and poled in said transmission paths to present a low impedance to said first and second windings in each of said coupling networks and to further present a high impedance to said third winding in each of said coupling networks whereby electrical coupling is assured between each of said subscriber lines connected to said terminal pairs.

2. In a communication circuit in accordance with claim 1, said improvement further comprising a plurality of networks simulating said subscriber lines, and means responsive to a removal of any of said subscribers for substituting a simulating network therefor.

3. A communication circuit for establishing multiple transmission paths among $n$ communicating terminals of substantially uniform characteristic impedance, said circuit comprising $n/2$ two-wire circuits, each of said two-wire circuits interconnecting a different pair of said terminals, a hybrid network connected in each of said two-wire circuits, each network comprising two coils connected in series in one wire of one of said two-wire circuits, a third coil shunting said one circuit at the common junction of said two coils, and a fourth coil inductively coupled to said two coils so that signal currents in said one circuit induce aiding currents in said fourth coil, and $n/2$ unidirectional signal coupling means each coupling signals in the fourth coil of one of said hybrid networks to the third coil in at least two other of said hybrid networks, said coupling means each having an input impedance which is much lower than its output impedance.

4. In a communication circuit for establishing conference connections among a plurality of subscriber lines, at least a first and second coupling network each having two terminal pairs connectable to two subscriber lines, a first distinct transmission path coupling the subscribers of said first network to the subscribers of said second network, said first transmission path comprising an amplifier having a low input impedance and a high output impedance, a first winding connected across the input of said first transmission path amplifier and inductively coupled with said first coupling network subscribers and a second winding connected across the output of said first transmission path amplifier and inductively coupled with said second coupling network subscribers, a second distinct transmission path comprising an amplifier substantially identical to the first transmission path amplifier and having third and fourth windings connected respectively across the input and output of said second amplifier and inductively coupled respectively to said second and said first network subscribers, said first winding of said first transmission path presenting a low impedance condition to said first network subscribers and said fourth winding of said second transmission path presenting a high impedance condition to said first network subscribers to assure electrical coupling between said first network subscribers and electrical isolation between said first and second transmission paths, said third winding of said second transmission path presenting a low impedance condition to said second network subscribers and said second winding of said first transmission path presenting a high impedance to said second network subscribers to assure electrical coupling between said second network subscribers and electrical isolation between said first and second transmission paths, a plurality of networks each simulating one of said subscribers' circuits, and means responsive to the removal of any of said subscribers' circuits for substituting a simulating network therefor.

5. A telephone conference circuit comprising a plurality of coupling networks each having first, second, third and fourth signal circuits, said first and second signal circuits having a common winding, means for connecting subscriber lines to said first and second signal circuits to assure electrical isolation between said third and fourth signal circuits, networks simulating said subscriber lines, means responsive to a disconnection of one of said subscriber lines for substituting a simulating network therefor, means for providing mismatched impedances to said third and fourth signal circuits to assure electrical coupling between said first and second signal circuits, said means for providing mismatched impedances being connected between said third signal circuit of each of said networks and said fourth signal circuit in each of the other networks in said plurality of coupling networks.

References Cited in the file of this patent

UNITED STATES PATENTS

| | | |
|---|---|---|
| 1,554,007 | Johnson | Sept. 15, 1925 |
| 1,973,504 | Pierrot | Sept. 11, 1934 |
| 2,209,955 | Black | Aug. 6, 1940 |
| 2,336,888 | Reier | Dec. 14, 1943 |
| 2,499,423 | Selinger | Mar. 7, 1950 |
| 2,647,958 | Barney | Aug. 4, 1953 |
| 2,694,113 | Meacham | Nov. 9, 1954 |
| 2,863,003 | Ridler et al. | Dec. 2, 1958 |

FOREIGN PATENTS

| | | |
|---|---|---|
| 110,182 | Austria | July 10, 1928 |